July 24, 1928.
C. A. GUSTAFSON
DRAFT APPLIANCE
Filed July 25, 1927
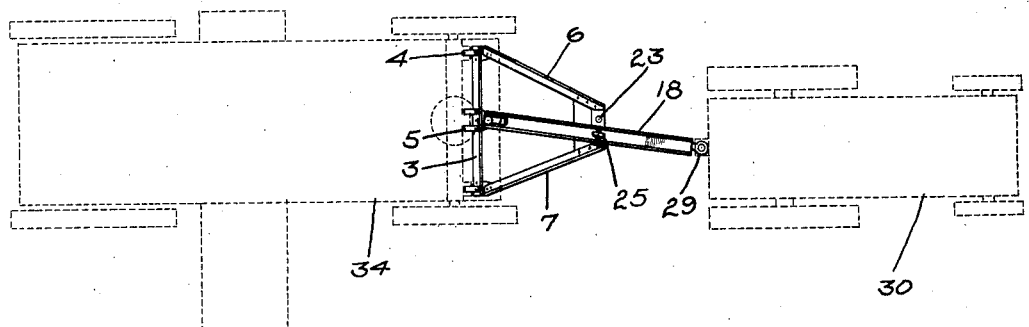
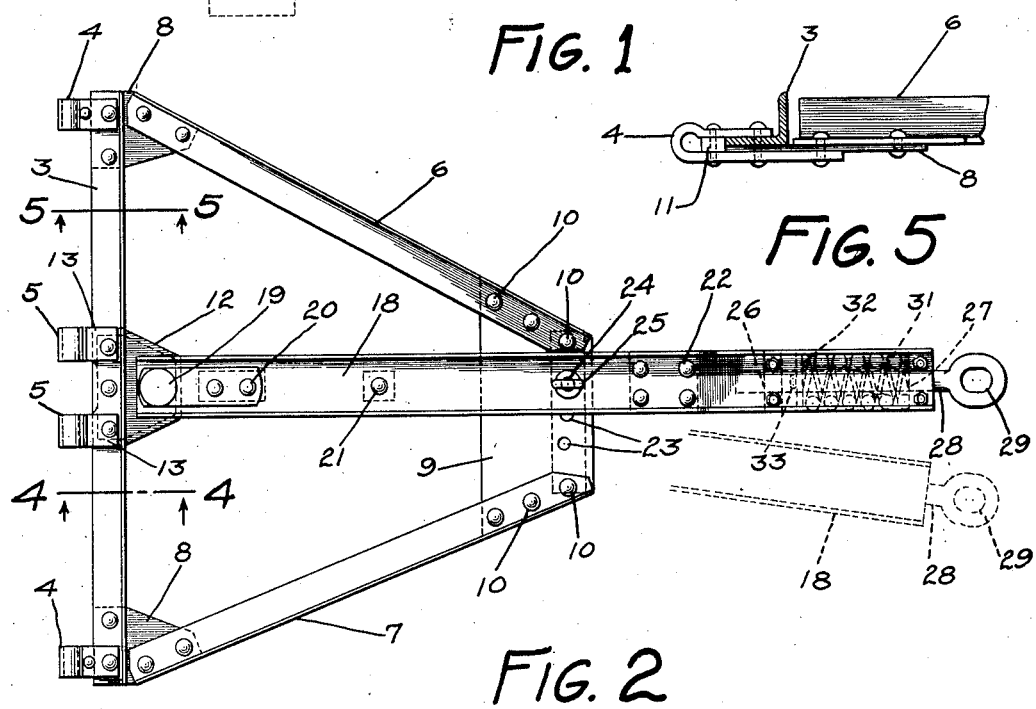
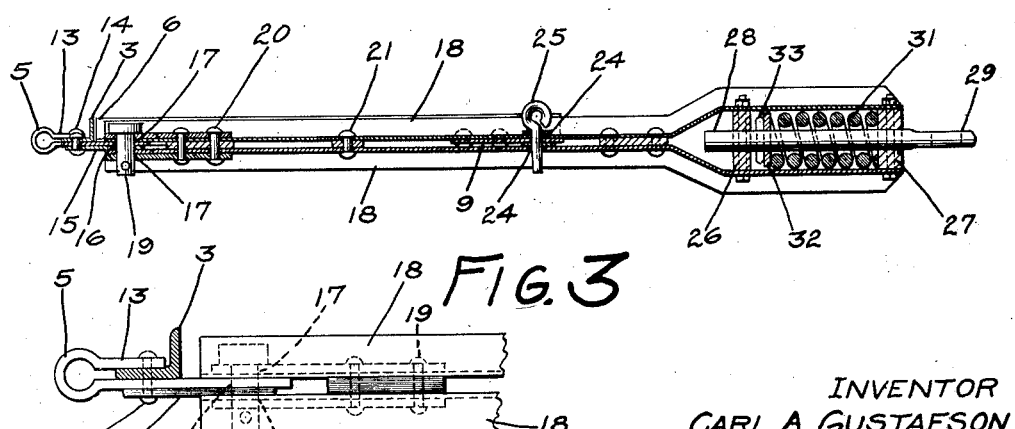
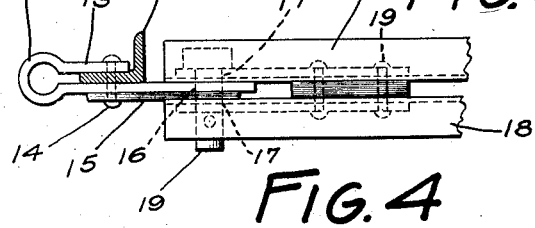
INVENTOR
CARL A. GUSTAFSON
By Paul, Paul & Moore
ATTORNEYS Patented July 24, 1928.

1,678,114

UNITED STATES PATENT OFFICE.

CARL A. GUSTAFSON, OF MINNEAPOLIS, MINNESOTA, ASSIGNOR TO RUSSELL-GRADER MANUFACTURING COMPANY, OF MINNEAPOLIS, MINNESOTA, A CORPORATION OF MINNESOTA.

DRAFT APPLIANCE.

Application filed July 25, 1927. Serial No. 208,255.

This invention relates to new and useful improvements in draft appliances, generally, and more particularly relates to improvements in such appliances adapted for use in connection with road graders, elevating graders, and similar apparatus, which usually are drawn or propelled by a tractor connected to the forward end thereof.

An object of the invention is to provide a draft appliance particularly adapted for use in connection with such apparatus, having means for laterally adjusting with respect to the longitudinal center line of the grader, the point of connection between the tractor and the grader, whereby the tractor, while pulling the grader, may be out of alinement therewith and at the same time, have the draft directed to the center of the forward portion of the grader, thus causing the latter to travel on a line substantially parallel to the line of travel of the tractor, but off-set with respect thereto.

A further object of the invention is to provide a draft appliance comprising a frame having its rear portion provided with means for pivotally connecting it to a grader or other apparatus, and having a draft bar pivotally connected with the rear central portion thereof, the intermediate portion of which is guidingly engaged with the forward end portion of said frame, and means being provided for locking the draft bar in adjusted position upon said frame.

A further object is to provide a draft appliance comprising a substantially triangular frame having its rear portion provided with means for pivotally and detachably connecting it to a grader or other apparatus, and having a draft bar pivotally connected to the rear portion of said frame at a point intermediately thereof, whereby the outer end of said draft bar may be laterally adjusted with respect to said frame, and said draft bar having a cushion spring provided at the forward end thereof to cushion the load or pull exerted thereon by the tractor, when pulling an apparatus.

Other objects of the invention reside in the general construction of the draft appliance as a whole; in the construction of the draft bar, which comprises two channel irons secured together back to back, and in spaced relation, whereby the plate provided at the forward end of the draft frame may be received therebetween to provide a guide for the draft bar; in the particular construction of the loops provided at the rear of the draft frame for connecting it to a grader, and whereby the frame will substantially be relieved of pulling strain, all such strains being taken up directly by the draft bar, pivotally connected with said frame; and in the provision of the cushion spring at the outer end of the draft bar.

Other objects of the invention will appear from the following description and accompanying drawings and will be pointed out in the annexed claims.

In the accompanying drawings, there has been disclosed a structure designed to carry out the various objects of the invention but it is to be understood that the invention is not confined to the exact features shown as various changes may be made within the scope of the claims which follow.

In the accompanying drawings forming part of this specification;

Figure 1 is a diagrammatic view showing the invention as applied to an elevating grader and a tractor, and also showing the draft bar adjusted to a position whereby the tractor will be out of longitudinal alinement with the grader;

Figure 2 is a plan view of the improved draft appliance showing in full lines the position of the draft bar, when alined with the grader, and showing in dotted lines the outer end of the draft bar when off-set from the longitudinal center line of the grader;

Figure 3 is a longitudinal sectional view of the appliance, showing in particular the general construction of the draft bar and the means provided for pivotally connecting it with the triangular frame, and also the means for locking the draft bar against movement with respect to said frame;

Figure 4 is a detailed sectional view on the line 4—4 of Figure 2; and

Figure 5 is a detailed sectional view on the line 5—5 of Figure 2.

The novel apparatus featured in this invention includes a frame structure adapted to be pivotally and detachably connected to the forward end of an excavating grader or similar apparatus. This frame comprises a rear cross member 3 having loops or eyes provided at its opposite ends, and having similar loops 5 provided at its center for pivotally connecting the frame to the grader. Side frame members 6 and 7 have their rear end portions secured to the cross member 3 by means of gusset plates 8, and the forward ends of these side frame members are connected together by means of a plate 9, secured thereto by suitable means such as rivets 10, shown in Figure 2. The loops 4 are preferably made of strap iron, and are secured to the cross member 3 as shown in Figure 5. Spacing blocks 11 are interposed between the legs of the loops as shown, and cooperate with the strap iron from which the loop is constructed, to form the pivot-pin aperture provided by the loops.

A plate 12 is secured to the cross member 4 at a point intermediate the ends thereof and the rear end portion of this plate is provided with strap portions 13, which are bent to provide the two center loops or eyes 5. The terminals of these strap portions 13 are engaged with the upper face of the cross member 3 as shown in Figure 4. Rivets 14 pass through alined apertures provided in the plate 12, strap terminals 13 and the cross member 3, as shown. A reinforcing plate 15 is also secured to the cross member 3 by means of the rivets 14 and has one face abutted against the lower face of the plate 12. These two plates are provided with an aperture 16 adapted to be alined with apertures 17, provided in the channel irons 18, constituting the draft bar of the apparatus. A suitable pivot pin or bolt 19 traverses the alined apertures 16 and 17, to pivotally connect the draft bar to the rear cross member 3 of the draft frame. As a result of the loops 5 being integrally formed with the plate 12, all direct pulling strains will be taken directly by the draft bar, thus substantially relieving the draft frame of such strains.

The draft bar comprises two channel irons 18 secured together in spaced relation by means of suitable rivets 20, 21, and 22. Suitable spacing blocks and plates are provided between the two channel irons to space them apart, as shown in Figure 3. The plate 9, at the forward end of the side frame members 6 and 7, is received in the space between the channel irons 18 as shown in Figure 3, and thus provides a guide for the draft bar at the forward end of the frame. A series of spaced apertures 23 are provided in the plate 9. These apertures are adapted selectively to be alined with apertures 24 provided in the channel irons 18. A suitable eye bolt 25 is adapted to be received in the apertures 24 of the draft bar and in one of the apertures 23 of the plate 9, to lock the draft bar in adjusted position upon the draft frame. In Figure 2, the full lines illustrate the draft bar when adjusted to a position in alinement with the longitudinal center line of the grader, and the dotted lines indicate one of its adjusted positions, which corresponds to the full line position shown in Figure 1.

The forward end portions of the channel irons 18 are preferably off-set and spaced apart by suitable spacing blocks 26 and 27. These blocks are apertured to receive a draw bolt 28, having an eye 29 to provide means for connecting it to a tractor 30, as indicated in Figure 1. A compression spring 31 is coiled about the draw bolt 28 and has one end seated against the spacing block 27 and its opposite end seated against a washer 32, held against movement upon the bolt 28 by means of a pin 33 traversing the bolt, as shown in Figure 3. This spring 31 provides means for cushioning the load or pull exerted upon the draft bar, when the draft appliance is being used as a connection between a tractor and a road grader or other apparatus.

This novel draft appliance has been found of particular value when used as a draft connection between a tractor and an excavating grader 34, such as indicated in Figure 1. By its use, the center line of the tractor may be off-set from the longitudinal center line of the grader as shown in Figure 1, thus permitting the excavating grader to operate to one side of the road bed while the tractor may be retained upon the solid ground to obtain better traction.

An important feature of the structure also resides in the particular mounting of the draw bar upon the draft frame, comprising the frame members 3, 6, and 7. Referring to Figures 1 and 2, it will be noted that the pivotal connection of the draft bar with the cross member 3 is located at a point intermediate of the ends thereof or in other words, its point of connection with the road grader is located on the longitudinal center line thereof. By thus connecting the draw bar with the cross member 3, the draft will be directed to the center of the road grader and not to one side thereof. Also, by integrally forming the two center loops 5 with the plate 12, the pull or draft will be transmitted directly from the draft bar to the road grader, through the plate 12 and loops 5, thus substantially relieving the cross member 3 of all pulling strains. When the intermediate portion of the draft bar is secured to the plate 9 by means of the eye bolt 25, the frame members 3, 6, and 7, and the draft bar will form in effect an integral draft frame. The spaced apertures 23 in the plate 9 provide means for laterally adjusting the forward end of the draft bar with respect to the draft frame, so that the point of connection between the tractor and the draft frame may be off-set from the longitudinal center line of the road grader, whereby the grader will follow the tractor on a line off-set from the longitudinal center line of the tractor, as illustrated in Figure 1.

In the drawings, I have shown the draft frame as being substantially triangular in form, but it is, of course, to be understood, that this frame need not necessarily be so formed, as various changes may be made in the construction thereof without departing from the invention. I prefer, however, to construct the frame as shown in Figures 1 and 2, whereby the side frame members 6 and 7 provide means for suitably bracing the point of connection between the forward end of the frame and the draft bar. It will also be noted by reference to Figure 2, that the side frame members 6 and 7 are not shown symmetrically arranged about the longitudinal center line of the draft bar, when in the full line position shown. The form of draft frame here shown is particularly designed for use in connection with a left hand excavating grader, such as indicated in dotted lines in Figure 1, and, when used in connection with such a grader, no provision need be made for laterally adjusting the outer end of the draft bar to a position at the left hand side of the longitudinal center line of the grader, it being only necessary to adjust it to the right hand side, as indicated in Figures 1 and 2. If desired, the frame member 6 may be arranged at the same angle as the frame member 7, in which case, additional apertures 23 may be provided in the plate 9, whereby the draft bar may be laterally adjusted to either side of the longitudinal center line of the grader.

In actual practice, it has been found that by securing the loops 4 and 5 to the draft frame, as above described, that substantially all of the pulling or tensional strains exerted upon the structure, will be taken up directly by the draw bar channel irons 18, plates 12 and 15, and the loops 5. It will also be noted by reference to Figure 1, that the loops or brackets 5 are attached to the front axle bolster of the grader at the center thereof or at the point where it is connected to the grader frame by the usual kingbolt, not shown. Thus, all of the draft will be directed to the center of the grader front axle, thereby avoiding the usual trouble of the axle crystallizing, which is likely to occur when the draft is applied at the outer ends of the axle as through the loops or brackets 4. The chief function of the loops 4 is to steady and guide the grader axle.

I claim as my invention:

1. In a draft appliance, the combination of a triangular frame having a rear cross member provided with means for pivotally connecting it to a grader, a draft bar pivotally connected with said rear frame member, said draft bar comprising opposed members connected together in spaced relation, a plate secured to the forward end of said frame and received between said members to provide a guide therefor, a series of spaced apertures in said plate, alined apertures in said members adapted selectively to be moved into registration with one of the apertures in said plate, and a locking bolt adapted to be received in said alined apertures to lock the draft bar in adjusted position.

2. In a draft appliance, the combination of a frame having means for connecting the rear portion thereof with a grader, a draft bar pivotally connected with the rear portion of said frame at a point intermediately thereof, said draft bar comprising opposed members connected together in spaced relation, a plate secured to the forward end of said frame and adapted to be received between said members to provide a guide therefor, means for securing the members to said plate, the outer ends of said members being off-set outwardly to provide an enlarged space therebetween, a draw bolt slidably mounted between the off-set end portions of said members, and a cushion spring coiled about said draw bolt between said members and having one end connected with said bolt and adapted to cushion the load.

3. In a draft appliance, the combination of a triangular frame having a rear cross member provided with means for pivotally connecting it to a grader, a draft bar pivotally connected with said rear frame member, said draft bar comprising opposed channel irons secured together in spaced relation, a plate secured to the forward end of said frame and received between said channel irons to provide a guide therefor, a series of spaced apertures in said plate, alined apertures in said channel irons adapted selectively to be moved into registration with one of the apertures in said plate, and a locking bolt adapted to be received in said alined apertures to lock the draft bar in adjusted position.

4. In a draft appliance, the combination of a frame having means for connecting the rear portion thereof with a grader, a draft bar pivotally connected with the rear portion of said frame at a point intermediately thereof, said draft bar comprising opposed channel irons secured together in spaced relation, a plate secured to the forward end of said frame and adapted to be received between said channel irons to provide a guide therefor, means for securing the channel irons to said plate, the outer ends of said channel irons being off-set outwardly to provide an enlarged space therebetween, a draw bolt slidably mounted between the off-set end portions of said channel irons, and a cushion spring coiled about said draw bolt between said channel irons and having one end connected with said bolt and adapted to cushion the load.

5. In a draft appliance, the combination of a frame comprising a rear cross member having means at each end thereof for connecting it with a grader, a plate secured to the intermediate portion of said member and having a portion extending forwardly therefrom, a draft bar having one end pivotally connected to said plate and having its other end extending forwardly beyond said frame, means for adjustably securing said draft bar to the forward end of said frame, means on said plate extending rearwardly thereof and adapted to be connected to the grader frame whereby substantially all of the draft strains will be directed to the center of the grader, and a cushion spring terminally mounted in said draft bar for cushioning the draft load.

6. In a draft appliance, the combination of a frame comprising a rear cross member having means at each end thereof for connecting it with a grader, a plate secured to the intermediate portion of said member and having a portion extending forwardly therefrom, a draft bar having one end pivotally connected to said plate and having its other end extending forwardly beyond said frame and adapted for lateral adjustment, means at the forward end of said draft bar for connecting it with a tractor, means for securing the draft bar to the forward end of said frame to lock it in adjusted position, and said plate having integral strap portions extending rearwardly and bent to provide loops for connecting the plate to a grader frame, whereby substantially all of the draft strains will be directed to the center of the grader and will be taken up by the draft bar and said plate.

In witness whereof, I have hereunto set my hand this 22nd day of July, 1927.

CARL A. GUSTAFSON.